US010360686B2

(12) United States Patent
Wang et al.

(10) Patent No.: US 10,360,686 B2
(45) Date of Patent: Jul. 23, 2019

(54) SPARSE IMAGE POINT CORRESPONDENCES GENERATION AND CORRESPONDENCES REFINEMENT SYSTEM FOR GROUND TRUTH STATIC SCENE SPARSE FLOW GENERATION

(71) Applicant: TUSIMPLE, San Diego, CA (US)

(72) Inventors: Yi Wang, San Diego, CA (US); Yi Luo, San Diego, CA (US); Wentao Zhu, San Diego, CA (US); Panqu Wang, San Diego, CA (US)

(73) Assignee: TUSIMPLE, San Diego, CA (US)

( * ) Notice: Subject to any disclaimer, the term of this patent is extended or adjusted under 35 U.S.C. 154(b) by 0 days.

(21) Appl. No.: 15/621,945

(22) Filed: Jun. 13, 2017

(65) Prior Publication Data
US 2018/0357773 A1    Dec. 13, 2018

(51) Int. Cl.
*G06T 7/00* (2017.01)
*G06T 7/207* (2017.01)
*G06T 7/285* (2017.01)
*G06T 7/579* (2017.01)
*G06T 7/246* (2017.01)
(Continued)

(52) U.S. Cl.
CPC ............ *G06T 7/207* (2017.01); *G01C 15/002* (2013.01); *G01C 21/28* (2013.01); *G06T 7/246* (2017.01); *G06T 7/285* (2017.01); *G06T 7/579* (2017.01); *G06T 2200/04* (2013.01); *G06T 2207/10016* (2013.01); *G06T 2207/10028* (2013.01); *G06T 2207/30261* (2013.01)

(58) Field of Classification Search
CPC .................... G05D 1/0251; G06T 7/74; G06T 2207/10028; G06T 2207/30244; G01S 17/023; G01S 17/89; G06K 9/622; G06K 9/6249; G06K 9/6288
See application file for complete search history.

(56) References Cited

U.S. PATENT DOCUMENTS

| 9,870,624 | B1 * | 1/2018 | Narang | ................... G06T 7/521 |
| 2015/0371431 | A1 * | 12/2015 | Korb | ......................... G06T 9/00 382/113 |
| 2016/0209846 | A1 * | 7/2016 | Eustice | ................ G05D 1/0246 |

(Continued)

OTHER PUBLICATIONS

Geiger etal., "Are we ready for Autonomous Driving? The KITTI Vision Benchmark Suite", Aug. 12, 2012, IEEE, 978-1-4673-1228-8/12, pp. 3354-3361.*

(Continued)

*Primary Examiner* — Ping Y Hsieh
(74) *Attorney, Agent, or Firm* — WPAT, PC

(57) ABSTRACT

A system for generating a ground truth dataset for motion planning of a vehicle is disclosed. The system includes an internet server that further includes an I/O port, configured to transmit and receive electrical signals to and from a client device; a memory; one or more processing units; and one or more programs stored in the memory and configured for execution by the one or more processing units, the one or more programs including instructions for: a corresponding module configured to correspond, for each pair of images, a first image of the pair to a LiDAR static-scene point cloud; and a computing module configured to compute a camera pose associated with the pair of images in the coordinate of the point cloud.

27 Claims, 9 Drawing Sheets

(51) Int. Cl.
*G01C 15/00* (2006.01)
*G01C 21/28* (2006.01)

(56) References Cited

U.S. PATENT DOCUMENTS

2017/0300059 A1\* 10/2017 Rust ..................... G01S 17/89
2018/0165831 A1\* 6/2018 Kwant ................... G06T 7/74

OTHER PUBLICATIONS

Zhang, A Flexible New Technigue for Camera Calibration, technical report, Dec. 2, 1998, pp. 1-21, Microsoft Research, Redmond, USA.
Geiger et al., Are we ready for Autonomous Driving? The KITTI Vision Benchmark Suite, Aug. 12, 2012.

\* cited by examiner

SPARSE IMAGE POINT CORRESPONDENCES GENERATION AND CORRESPONDENCES REFINEMENT SYSTEM FOR GROUND TRUTH STATIC SCENE SPARSE FLOW GENERATION

PRIORITY/RELATED DOCUMENTS

This patent application incorporates by reference in their entireties and claims priority to these co-pending patent applications filed on Jun. 13, 2017, including the following: "Sensor Calibration and Time Method for Ground Truth Static Scene Sparse Flow Generation," "Sensor Calibration and Time System for Ground Truth Static Scene Sparse Flow Generation," "Time Synchronization and Data Acquisition Method for Ground Truth Static Scene Sparse Flow Generation," "Time Synchronization and Data Acquisition System for Ground Truth Static Scene Sparse Flow Generation," "Undistorted Raw LiDAR Scans and Static Point Extractions Method for Ground Truth Static Scene Sparse Flow Generation," "Undistorted Raw LiDAR Scans and Static Point Extractions System for Ground Truth Static Scene Sparse Flow Generation," and "Sparse Image Point Correspondences Generation and Correspondences Refinement Method for Ground Truth Static Scene Sparse Flow Generation," and all with the same inventor(s).

FIELD OF THE DISCLOSURE

The field of the disclosure is in general related to autonomous vehicles and, in particular, to a method of sensor calibration and time synchronization for ground truth static scene sparse flow generation.

BACKGROUND OF THE DISCLOSURE

In recent years, an increasing amount of interest and research effort has been put toward intelligent or autonomous vehicles. With the continuous progress in autonomous technology, robot sensors are generating increasing amounts of real-world data. Autonomous vehicle research is highly dependent on the vast quantities of real-world data for development, testing and validation of algorithms before deployment on public roads. However, the cost of processing and analyzing these data, including developing and maintaining a suitable autonomous vehicle platform, regular calibration and data collection procedures, and storing the collected data, is so high that few research groups can manage it. Following the benchmark-driven approach of the computer vision community, a number of vision-based autonomous driving datasets have been released. Some existing datasets, however, may not be well generalized to different environments.

All referenced patents, applications and literatures throughout this disclosure are incorporated herein by reference in their entirety. For example, including the following references:

Z. Zhang, "*A flexible new technique for camera calibration*", IEEE Transactions on Pattern Analysis and Machine Intelligence, 22(11):1330-1334, 2000; https://pdfs.semanticscholar.org/7fc6/2b438ca48203c7f48e216dae8633db74d2e8.pdf;

Andreas Geiger and Philip Lenz Karlsruhe Institute of Technology {geiger,lenz}@kit.edu; and Raquel Urtasun Toyota Technological Institute at Chicago rurtasun@ttic.edu "*Are we ready for Autonomous Driving? The KITTI Vision Benchmark Suit*", Computer Vision and Pattern Recognition (CVPR), 2012 IEEE Conference on. IEEE, 2012; www.cvlibs.net/publications/Geiger2012CVPR.pdf;

Andreas Geiger, Frank Moosmann, "Omer Car and Bernhard Schuster, "*Automatic Camera and Range Sensor Calibration using a single Shot*", http://www.cvlibs.net/publications/Geiger2012ICRA.pdf;

Ji Zhang and Sanjiv Singh, "*LOAM: Lidar Odometry and Mapping in Real-time*"; www.cvlibs.net/projects/autonomous_vision_survey/literature/Zhang2014RSS.pdf:

Jesse Levinson, Sebastian Thrun Stanford Artificial Intelligence Laboratory {jessel,thrun}@stanford.edu; "*Unsupervised Calibration for Multi-beam Lasers*"; www-.driving.stanford.edu/papers/ISER2010.pdf;

S. Baker, D. Scharstein, J. Lewis, S. Roth, M. Black, and R. Szeliski. "*A Database and Evaluation Methodology for Optical Flow*", IJCV, 92:1-31, 2011; https://vision-.middlebury.edu/flow/floweval-ijcv2011.pdf; and S. Morales and R. Klette, "*Ground truth evaluation of stereo algorithms for real world applications*", In ACCV Workshops, volume 2 of LNCS, pages 152-162, 2010; https://pdfs.semanticscholar.org/254a/2d2967341d8d9bfa9c332e82c927e0d8a0d6.pdf

BRIEF SUMMARY OF THE DISCLOSURE

Various objects, features, aspects and advantages of the present embodiment will become more apparent from the following detailed description of embodiments of the embodiment, along with the accompanying drawings in which like numerals represent like components.

Embodiments of the present disclosure provide a system for generating a ground truth dataset for motion planning of a vehicle. The system includes an internet server that further includes an I/O port, configured to transmit and receive electrical signals to and from a client device; a memory; one or more processing units; and one or more programs stored in the memory and configured for execution by the one or more processing units, the one or more programs including instructions for: a corresponding module configured to correspond, for each pair of images, a first image of the pair to a LiDAR static-scene point cloud; and a computing module configured to compute a camera pose associated with the pair of images in the coordinate of the point cloud.

In an embodiment, the computing module is configured to compute the camera pose associated with the pair of images in the coordinate of the point cloud as extrinsic parameters are sent from GNSS-insertion estimates.

In another embodiment, the system further includes: a first generating module configured to generate, for each 3D point in the point cloud, two image points in sub-pixel accuracy.

In yet another embodiment, the first generating module is configured to generate the two image points in sub-pixel accuracy by projecting the 3D point onto the pair of images.

In still another embodiment, the system further includes: an establishing module configured to establish a correspondence between the two image points.

In yet still another embodiment, the system further includes: a second generating module configured to generate sparse image point correspondences in the pair of images.

In still yet another embodiment, the system further includes: a comparing module configured to compare local image patches near correspondence image points.

In an embodiment, the system further includes: a rejecting module configured to reject correspondences that have a significant difference in the local image patches.

In another embodiment, the system further includes: a storing filtered configured to store sparse image point correspondences as a ground truth for a static-scene dataset for motion planning.

Embodiments of the present disclosure also provide a system having a non-transitory computer readable storage medium storing one or more programs, the one or more programs comprising instructions which, when executed by the one or more processors of a computing device, cause the computing device to: correspond, for each pair of images, a first image of the pair to a LiDAR static-scene point cloud; and compute a camera pose associated with the pair of images in the coordinate of the point cloud align close points based on pose estimates.

In an embodiment, the system further includes instructions which, when executed by the one or more processors, cause the computing device to: compute the camera pose associated with the pair of images in the coordinate of the point cloud as extrinsic parameters are sent from GNSS-insertion estimates.

In another embodiment, the system further includes instructions which, when executed by the one or more processors, cause the computing device to: generate, for each 3D point in the point cloud, two image points in sub-pixel accuracy.

In still another embodiment, the system further includes instructions which, when executed by the one or more processors, cause the computing device to: generate the two image points in sub-pixel accuracy by projecting the 3D point onto the pair of images.

In yet another embodiment, the system further includes instructions which, when executed by the one or more processors, cause the computing device to: establish a correspondence between the two image points.

In yet still another embodiment, the system further includes instructions which, when executed by the one or more processors, cause the computing device to: generate sparse image point correspondences in the pair of images.

In still yet another embodiment, the system further includes instructions which, when executed by the one or more processors, cause the computing device to: compare local image patches near correspondence image points.

In an embodiment, the system further includes instructions which, when executed by the one or more processors, cause the computing device to: reject correspondences that have a significant difference in the local image patches.

In another embodiment, the system further includes instructions which, when executed by the one or more processors, cause the computing device to: store sparse image point correspondences as a ground truth for a static-scene dataset for motion planning.

BRIEF DESCRIPTION OF THE DRAWINGS

It should be noted that the drawing figures may be in simplified form and might not be to precise scale. In reference to the disclosure herein, for purposes of convenience and clarity only, directional terms such as top, bottom, left, right, up, down, over, above, below, beneath, rear, front, distal, and proximal are used with respect to the accompanying drawings. Such directional terms should not be construed to limit the scope of the embodiment in any manner.

DETAILED DESCRIPTION OF THE EMBODIMENTS

Figure 1:
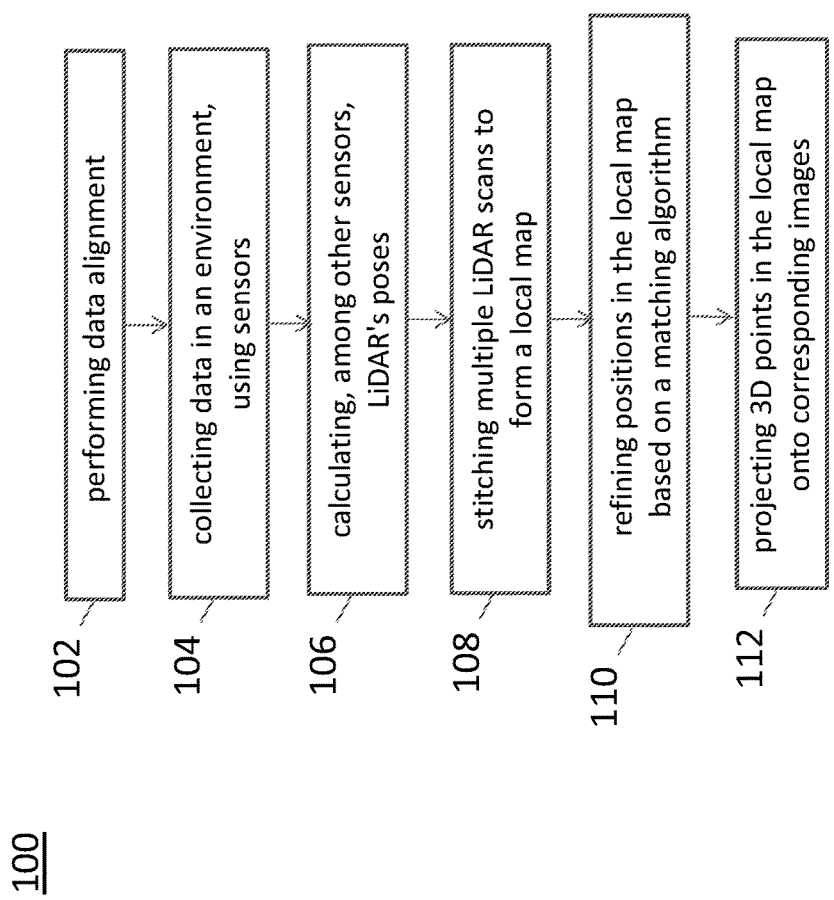
FIG. 1 is a flow diagram showing a method of generating a ground truth dataset for motion planning, in accordance with some embodiments.

The embodiment and its various embodiments can now be better understood by turning to the following detailed description of the embodiments, which are presented as illustrated examples of the embodiment defined in the claims. It is expressly understood that the embodiment as defined by the claims may be broader than the illustrated embodiments described below.

Any alterations and modifications in the described embodiments, and any further applications of principles described in this document are contemplated as would normally occur to one of ordinary skill in the art to which the disclosure relates. Specific examples of components and arrangements are described below to simplify the present disclosure. These are, of course, merely examples and are not intended to be limiting. For example, when an element is referred to as being "connected to" or "coupled to" another element, it may be directly connected to or coupled to the other element, or intervening elements may be present.

In the drawings, the shape and thickness may be exaggerated for clarity and convenience. This description will be directed in particular to elements forming part of, or cooperating more directly with, an apparatus in accordance with the present disclosure. It is to be understood that elements not specifically shown or described may take various forms. Reference throughout this specification to "one embodiment" or "an embodiment" means that a particular feature, structure, or characteristic described in connection with the embodiment is included in at least one embodiment.

In the drawings, the figures are not necessarily drawn to scale, and in some instances the drawings have been exaggerated and/or simplified in places for illustrative purposes. One of ordinary skill in the art will appreciate the many possible applications and variations of the present disclosure based on the following illustrative embodiments of the present disclosure.

The appearances of the phrases "in one embodiment" or "in an embodiment" in various places throughout this specification are not necessarily all referring to the same embodiment. Furthermore, the particular features, structures, or characteristics may be combined in any suitable manner in one or more embodiments. It should be appreciated that the following figures are not drawn to scale; rather, these figures are merely intended for illustration.

It will be understood that singular forms "a", "an" and "the" are intended to include the plural forms as well, unless the context clearly indicates otherwise. Furthermore, relative terms, such as "bottom" and "top," may be used herein to describe one element's relationship to other elements as illustrated in the Figures.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Many alterations and modifications may be made by those having ordinary skill in the art without departing from the spirit and scope of the embodiment. Therefore, it must be understood that the illustrated embodiment has been set forth only for the purposes of example and that it should not be taken as limiting the embodiment as defined by the following claims. For example, notwithstanding the fact that the elements of a claim are set forth below in a certain combination, it must be expressly understood that the embodiment includes other combinations of fewer, more, or different elements, which are disclosed herein even when not initially claimed in such combinations.

The words used in this specification to describe the embodiment and its various embodiments are to be understood not only in the sense of their commonly defined meanings, but to include by special definition in this specification structure, material or acts beyond the scope of the commonly defined meanings. Thus if an element can be understood in the context of this specification as including more than one meaning, then its use in a claim must be understood as being generic to all possible meanings supported by the specification and by the word itself.

The definitions of the words or elements of the following claims therefore include not only the combination of elements which are literally set forth, but all equivalent structure, material or acts for performing substantially the same function in substantially the same way to obtain substantially the same result.

In this sense it is therefore contemplated that an equivalent substitution of two or more elements may be made for any one of the elements in the claims below or that a single element may be substituted for two or more elements in a claim. Although elements may be described above as acting in certain combinations and even initially claimed as such, it is to be expressly understood that one or more elements from a claimed combination can in some cases be excised from the combination and that the claimed combination may be directed to a subcombination or variation of a subcombination.

Reference is now made to the drawings wherein like numerals refer to like parts throughout.

As used herein, the term "wireless" refers to wireless communication to a device or between multiple devices.

Wireless devices may be anchored to a location and/or hardwired to a power system, depending on the needs of the business, venue, event or museum. In one embodiment, wireless devices may be enabled to connect to Internet, but do not need to transfer data to and from Internet in order to communicate within the wireless information communication and delivery system.

As used herein, the term "Smart Phone" or "smart phone" or "mobile device(s)" or "cellular phone" or "cellular" or "mobile phone" or the like refers to a wireless communication device, that includes, but not is limited to, an integrated circuit (IC), chip set, chip, system-on-a-chip including low noise amplifier, power amplifier, Application Specific Integrated Circuit (ASIC), digital integrated circuits, a transceiver, receiver, or transmitter, dynamic, static or non-transitory memory device(s), one or more computer processor(s) to process received and transmitted signals, for example, to and from the Internet, other wireless devices, and to provide communication within the wireless information communication and delivery system including send, broadcast, and receive information, signal data, location data, a bus line, an antenna to transmit and receive signals, and power supply such as a rechargeable battery or power storage unit. The chip or IC may be constructed ("fabricated") on a "die" cut from, for example, a Silicon, Sapphire, Indium Phosphide, or Gallium Arsenide wafer. The IC may be, for example, analogue or digital on a chip or hybrid combination thereof. Furthermore, digital integrated circuits may contain anything from one to thousands or millions of signal invertors, and logic gates, e.g., "and", "or", "nand" and "nor gates", flipflops, multiplexors, etc., on a square area that occupies only a few millimeters. The small size of, for instance, IC's allows these circuits to provide high speed operation, low power dissipation, and reduced manufacturing cost compared with more complicated board-level integration.

As used herein, the terms "wireless", "wireless data transfer," "wireless tracking and location system," "positioning system" and "wireless positioning system" refer without limitation to any wireless system that transfers data or communicates or broadcasts a message, which communication may include location coordinates or other information using one or more devices, e.g., wireless communication devices.

As used herein, the terms "module" or "modules" refer without limitation to any software, software program(s), firmware, or actual hardware or combination thereof that has been added on, downloaded, updated, transferred or originally part of a larger computation or transceiver system that assists in or provides computational ability including, but not limited to, logic functionality to assist in or provide communication broadcasts of commands or messages, which communication may include location coordinates or communications between, among, or to one or more devices, e.g., wireless communication devices.

FIG. 1 is a flow diagram showing a method 100 of generating a ground truth dataset for motion planning, in accordance with some embodiments.

In some embodiments in accordance with the present disclosure, a non-transitory, i.e., non-volatile, computer readable storage medium is provided. The non-transitory computer readable storage medium is stored with one or more programs. When the program is executed by the processing unit of a computing device, i.e., that are part of a vehicle, the computing device is caused to conduct specific operations set forth below in accordance with some embodiments of the present disclosure.

Figure 7:
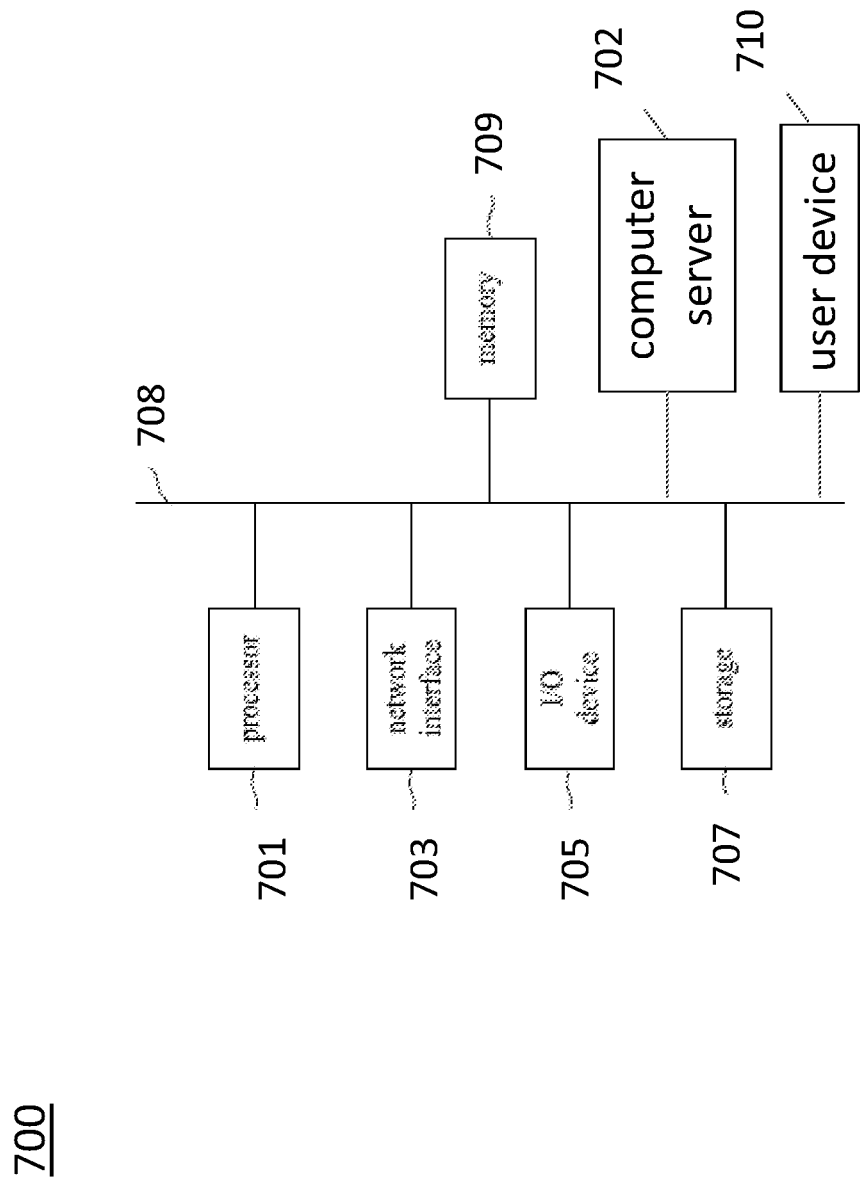
FIG. 7 is a block diagram of a system for generating a ground truth dataset for motion planning, in accordance with some embodiments.

In some embodiments, as illustrated in FIG. 7, examples of non-transitory storage computer readable storage medium may include magnetic hard discs, optical discs, floppy discs, flash memories, or forms of electrically programmable memories (EPROM) or electrically erasable and programmable (EEPROM) memories. In certain embodiments, the term "non-transitory" may indicate that the storage medium is not embodied in a carrier wave or a propagated signal. In some embodiments, a non-transitory storage medium may store data that can, over time, change (e.g., in RAM or cache).

In some embodiments in accordance with the present disclosure, in operation, a client application is transmitted to the computing device upon a request of a user, for example, by a smart phone 710 (see FIG. 7). For example, the first client device 710 may be a smart phone downloading the application from a computer server. In operation, the application is installed at the vehicle. Accordingly, specific functions may be executed by the user through a computing device, such as calibrating sensors and time synchronization, and, for example, sending and receiving calibration files for data alignment purposes.

In particular, referring to FIG. 1, in operation 102, data alignment, which includes sensor calibration and time synchronization, is performed. A vehicle is equipped with multiple complementary sensors which require calibration in order to represent sensed information in a common coordinate system. In an embodiment, sensors employed in the method include a light detection and ranging (LiDAR) sensor, cameras and an inertial navigation system. The LiDAR sensor and the cameras are mounted on the roof of the vehicle. LiDAR sensors have become increasingly common in both industrial and robotic applications. LIDAR sensors are particularly desirable for their direct distance measurements and high accuracy. In an embodiment according to the present disclosure, the LIDAR sensor is equipped with many simultaneous rotating beams at varying angles, for example, a 64-beam rotating LiDAR. The multiple-beam LiDAR provides at least an order of magnitude more data than a single-beam LiDAR and enables new applications in mapping, object detection and recognition, scene understanding, and simultaneous localization and mapping (SLAM).

The inertial navigation system in an embodiment according to the present disclosure includes a global navigation satellite system (GNSS)-inertial measurement unit (IMU). The GNSS satellite signals are used to correct or calibrate a solution from the IMU. The benefits of using GNSS with an IMU are that the IMU may be calibrated by the GNSS signals and that the IMU can provide position and angle updates at a quicker rate than GNSS. For high dynamic vehicles, IMU fills in the gaps between GNSS positions. Additionally, GNSS may lose its signal and the IMU can continue to compute the position and angle during the period of lost GNSS signal. The two systems are complementary and are often employed together.

Transformation between the inertial navigation system and LiDAR coordinate is achieved by a method similar to that described in "*Unsupervised Calibration for Multi-beam Lasers*" by Levinson, Jesse and Sebastian Thrun, *Experimental Robotics*, Springer Berlin Heidelberg, 2014. Modifications made in the method 100 include, for example, the intrinsic parameters of each beam are calibrated in advance using a supervised method. Also, LiDAR scans are collected in the form of sweep. A sweep is defined as a scan coverage of the LiDAR sensor rotating from 0 degree to 360 degrees. Moreover, motion distortion within the sweep is corrected assuming that the angular and linear velocity of the LiDAR motion is constant.

The transformation between the inertial navigation system and LiDAR coordinate is briefly discussed as follows. In the case of a multi-beam LiDAR, extrinsic calibration considers the mounting location of the entire unit relative to the vehicle's own coordinate frame, while intrinsic calibration considers the configuration of each individual beam inside the unit. In an embodiment according to the present disclosure, an unsupervised method is used for extrinsic calibration, and a supervised method is used for intrinsic calibration. Specifically, the intrinsic parameters of each beam are calibrated in advance using the supervised approach.

The approach for both calibrations leverages the simple observation that laser returns projected into three dimensions are not randomly distributed in space. Since the returned points are reflections off of physical surfaces, it is impossible for a properly calibrated sensor traveling a known trajectory to return a collection of accumulated points that is randomly distributed in three dimensions. As such, the method 100 relies only on an assumption that points in space tend to lie on contiguous surfaces.

The location of the LiDAR sensor relative to the vehicle's coordinate frame can be expressed with an x (longitudinal), y (lateral), and z (height) offset along with roll, pitch, and yaw angles. The (0, 0, 0) reference point and reference orientation is specified by the coordinate system being used, i.e., the three dimension point and orientation that the vehicle's positioning system considers to be the origin.

It is assumed that the environment is generally static and contains some 3D features, i.e., it is not just smooth ground. In order to achieve an accurate calibration, LiDAR measurements are recorded as the vehicle transitions through a series of known poses. Global pose information is irrelevant, as there is no existing map, so only local pose information is required. Local pose data may be acquired in any number of ways, e.g. from a wheel encoder and IMU, from an integrated GPS/IMU system, or from a GPS system with real-time corrections.

Transformation between the cameras and the LiDAR coordinate is calibrated using a method similar to that described in "Automatic Camera and Range Sensor Calibration Using a Single Shot" by Geiger, Andreas, et al., *Robotics and Automation (ICRA)*, 2012 IEEE International Conference on. IEEE, 2012. Modifications made in the method 100 include, for example, the intrinsic parameters of the cameras are calibrated in advance using a method described in "A Flexible New Technique for Camera Calibration" by Z. Zhang, *IEEE Transactions on Pattern Analysis and Machine Intelligence*, 22(11):1330-1334, 2000. Also, the cameras include monocular cameras, which are calibrated by multiple shots instead of single shot. Moreover, registration is made by minimizing reprojection error and translation norm.

The transformation between the cameras and the LiDAR coordinate is briefly discussed as follows. The method 100 relies on an inexpensive and simple calibration setup: Multiple printed checkerboard patterns are attached to walls and floor. As input, the method 100 requires multiple range or camera images of a single calibration target presented at different orientations, as well as the number of checkerboard rows and columns as input. The only assumption is that all sensors return either intensity or depth images and share a common field of view.

In addition to the transformation between the inertial navigation system and LiDAR coordinate and the transformation between the cameras and the LiDAR coordinate, time synchronization among the LiDAR sensor, cameras and inertial navigation system is achieved. Specifically, time synchronization between the LiDAR sensor and the inertial navigation system, between the inertial navigation system and the cameras, and between the LiDAR sensor and the cameras is achieved. In an embodiment, data acquisition of the cameras and the LiDAR sensor are synchronized by a trigger metric.

After data alignment is performed, in operation 104, these sensors are used to collect data in an environment. In an embodiment, images of the environment are captured by the cameras in approximately 30 Hz. LiDAR scans are collected in the form of a sweep in approximately 20 Hz. Vehicle poses, including position and orientation, are collected in an "east north up" (ENU) coordinate by the inertial navigation system in approximately 50 Hz.

In operation 106, LiDAR's poses, among other sensors, are calculated. Assuming that the angular and linear velocity of the LiDAR sensor is constant within each sweep, the LiDAR's orientations and positions, when observing points within the sweep at different times can be computed. In an embodiment according to the present disclosure, the LiDAR's poses are calculated by linearly interpolating two GNSS-inertial pose estimates that are closest in time. Then LiDAR raw scans can be transformed into undistorted LiDAR scans by adjusting each point to a 3D position as if it was observed at the starting time of the sweep. Reference in this regard can be made to "LOAM: Lidar Odometry and Mapping in Real-time" by Zhang, Ji, and Sanjiv Singh, *Robotics: Science and Systems*. Vol. 2. 2014. In an embodiment, the method 100 uses a moving 2-axis LiDAR for motion estimation and mapping. Since the laser points are received at different times, distortion is present in the point cloud due to motion of the LiDAR. The method 100 decomposes the problem by two algorithms running in parallel. An odometry algorithm estimates velocity of the LiDAR and corrects distortion in the point cloud, and a mapping algorithm matches and registers the point cloud to create a map. Combination of the two algorithms ensures feasibility of the problem to be solved in real-time.

In operation 108, multiple LiDAR scans are stitched to form a local map.

In operation 110, positions in the local map are refined based on a matching algorithm. In an embodiment, the matching algorithm includes an iterative closest point (ICP) method.

Subsequently, in operation 112, 3D points in the local map are projected onto corresponding images.

Figure 2:
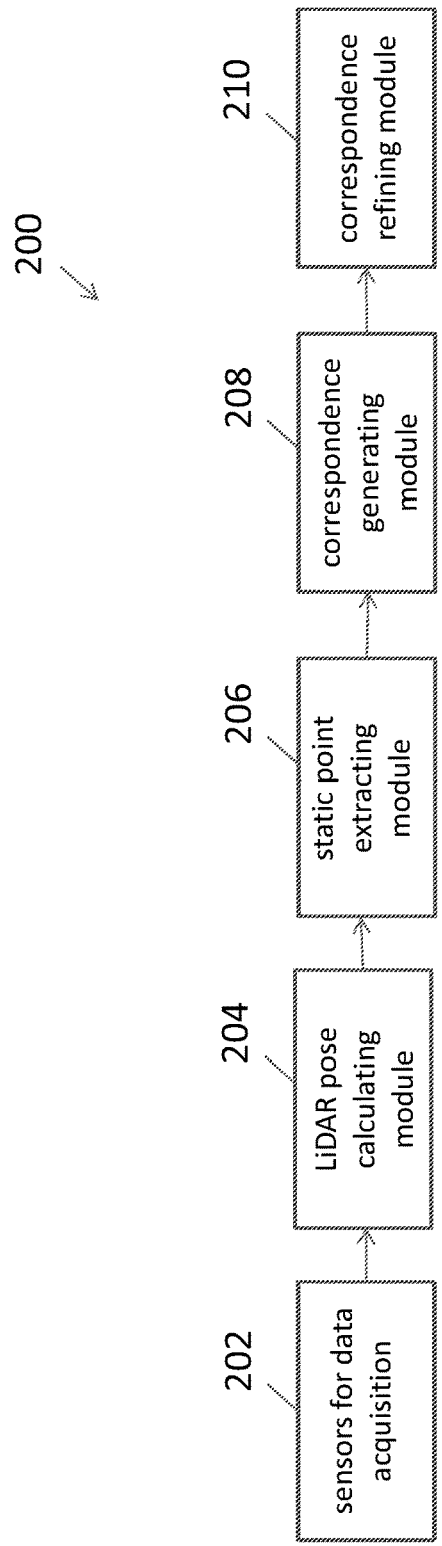
FIG. 2 is a block diagram of a system for generating a ground truth dataset for motion planning, in accordance with some embodiments.

FIG. 2 is a block diagram of a system 200 for generating a ground truth dataset for motion planning, in accordance with some embodiments.

Referring to FIG. 2, the system 200 includes sensors 202 for data acquisition, a LiDAR pose calculating module 204, a static point extracting module 206, a correspondence generating module 208 and a correspondence refining module 210.

The sensors 202, including a LiDAR, cameras and a GNSS-inertia system, are configured to perceive and understand the scene surrounding in an environment. As such, an autonomous vehicle is able to detect objects, classify the environment and analyze the condition of the road surface. To obtain accurate sensor measurements, intrinsic and extrinsic parameters of the sensors 202 are estimated. In addition, the sensors 202 are calibrated in order to convert data between the local coordinate systems of the sensors 202. Calibration can be divided into two parts: intrinsic calibration, in which the intrinsic parameters of the sensors, such as focal length, skew parameter and image center, are estimated; and extrinsic calibration, in which the rigid body transformation among the sensors 202 is estimated. For example, to optimally combine LiDAR and camera measurements, accurate extrinsic calibration of the six degrees of freedom transformation between the sensors is required.

The LiDAR pose calculating module 204 is configured to calculate the pose, including position and orientation, of the LiDAR in response to data from the sensors 202 and generate undistorted LiDAR scans.

The static point extracting module 206 is configured to extract static points from a target undistorted LiDAR scan and generate a LiDAR static-scene point cloud. For a pair of undistorted LiDAR scans, points that belong to static objects in the environment can be aligned close to each other using the GNSS-inertial pose estimates. To extract static points from each target undistorted LiDAR scan, a reference scan that is close in time is transformed to align with the target scan. A point is determined as a static point and is extracted from the target scan if its closest point in an aligned reference scan is less than a specific threshold. Subsequently, each undistorted LiDAR scan is processed to generate a LiDAR static-scene point cloud.

The correspondence generating module 208 is configured to generate sparse image point correspondences for each pair of images, using the LiDAR static-scene point cloud. For each pair of images, the LiDAR static-scene point cloud corresponding to first images in the pair is used. Then the camera pose of the images in the coordinate of the selected point cloud is computed as extrinsic parameters from the GNSS-inertial estimates. For each 3D point in the point cloud, two image points in sub-pixel accuracy are generated by projecting the 3D point onto the pair of images using the extrinsic and intrinsic parameters of the cameras and a correspondence between the two image points is established. Therefore such projection can produce sparse image point correspondences in the pair of images.

The correspondence refining module 210 is configured to filter out sparse image point correspondences related to invalid pixels. The correspondences that are related to occluded pixels are filtered out automatically by comparing the local image patches near the correspondence image points and rejecting those having a large difference in image patches. The filtered sparse correspondences are stored as the ground truth for static scene optical flow.

Figure 3:
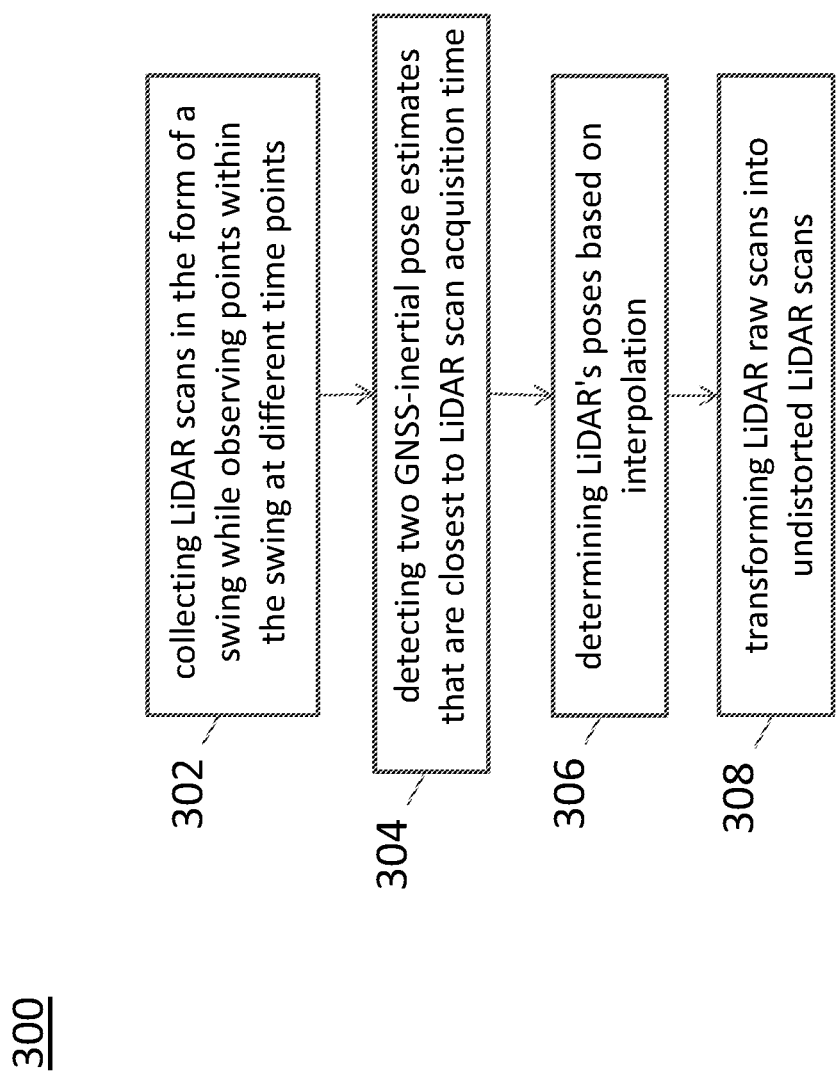
FIG. 3 is a flow diagram showing a method of generating undistorted LiDAR scans, in accordance with some embodiments.

FIG. 3 is a flow diagram showing a method 300 of generating undistorted LiDAR scans, in accordance with some embodiments.

Referring to FIG. 3, in operation 302, LiDAR scans in the form of a swing are collected while observing points within the swing at different time.

In operation 302, two GNSS-inertial pose estimates that are closest to LiDAR scan accusation time are detected.

In operation 306, LiDAR's poses based on interpolation are determined.

In operation 308, LiDAR raw scans are transformed into undistorted LiDAR scans.

A computing system or a processor (such as that illustrated in FIG. 7) may be configured to execute program instructions that include a tool module configured to perform a method as described and illustrated with reference to FIG. 3. Accordingly, the tool module is configured to execute the operations including collecting LiDAR scans in the form of a swing while observing points within the swing at different time points; detecting two GNSS-inertial pose estimates that are closest to LiDAR scan accusation time, determining LiDAR's poses based on interpolation, and transforming LiDAR raw scans into undistorted LiDAR scans.

Figure 4:
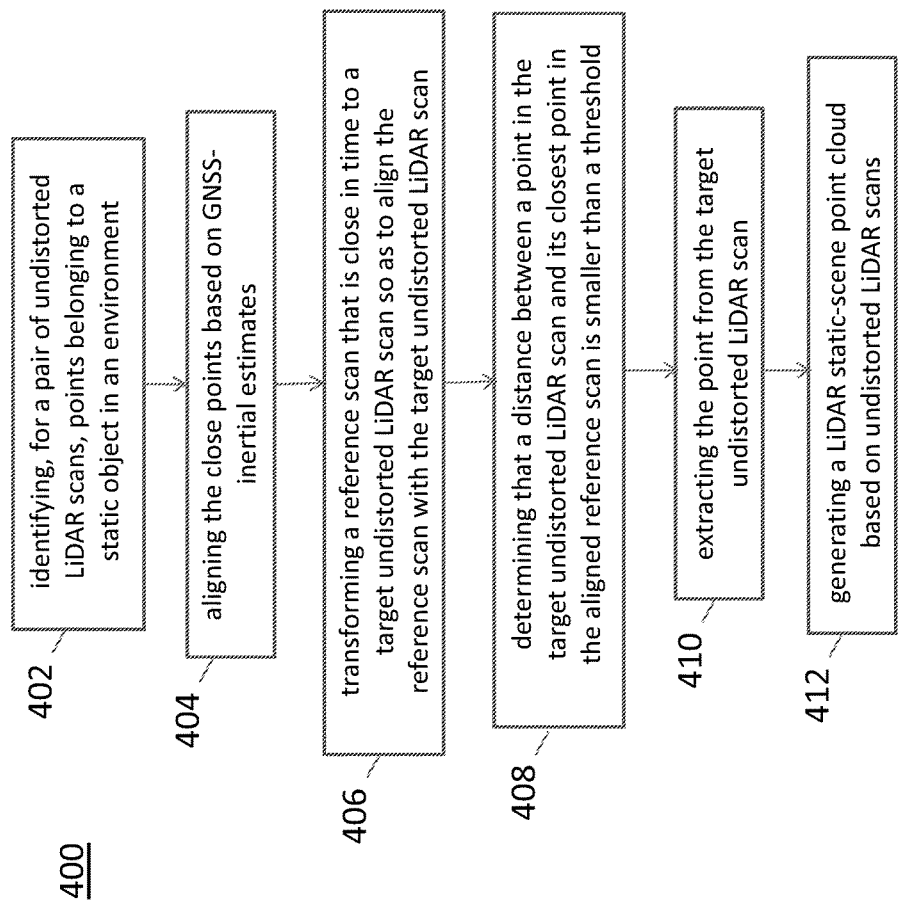
FIG. 4 is a flow diagram showing a method of generating a LiDAR static-scene point cloud, in accordance with some embodiments.

FIG. 4 is a flow diagram showing a method 400 of generating a LiDAR static-scene point cloud, in accordance with some embodiments.

Referring to FIG. 4, in operation 402, for a pair of undistorted LiDAR scans, points belonging to a static object in an environment are identified.

In operation 404, close points are aligned based on GNSS-inertial estimates.

Next, in operation 406, a reference scan that is close in time to a target undistorted LiDAR scan is transformed so as to align the reference scan with the target undistorted LiDAR scan.

In operation 408, it is determined that a distance between a point in the target undistorted LiDAR scan and its closest point in the aligned reference scan is smaller than a threshold.

Subsequently, in operation 410, the point from the target undistorted LiDAR scan is extracted.

Then in operation 412, a LiDAR static-scene point cloud based on undistorted LiDAR scans is generated.

Similarly, a computing system or a processor (such as that illustrated in FIG. 7) may be configured to execute program instructions that include a tool module configured to perform a method as described and illustrated with reference to FIG. 4. Accordingly, the tool module is configured to execute the operations include: identifying, for a pair of undistorted LiDAR scans, points belonging to a static object in an environment; aligning the close points based on GNSS-inertial estimates; transforming a reference scan that is close in time to a target undistorted LiDAR scan so as to align the reference scan with the target undistorted LiDAR scan; determining that a distance between a point in the target undistorted LiDAR scan and its closest point in the aligned reference scan is smaller than a threshold; extracting the point from the target undistorted LiDAR scan; and generating a LiDAR static-scene point cloud based on undistorted LiDAR scans.

Figure 5A:
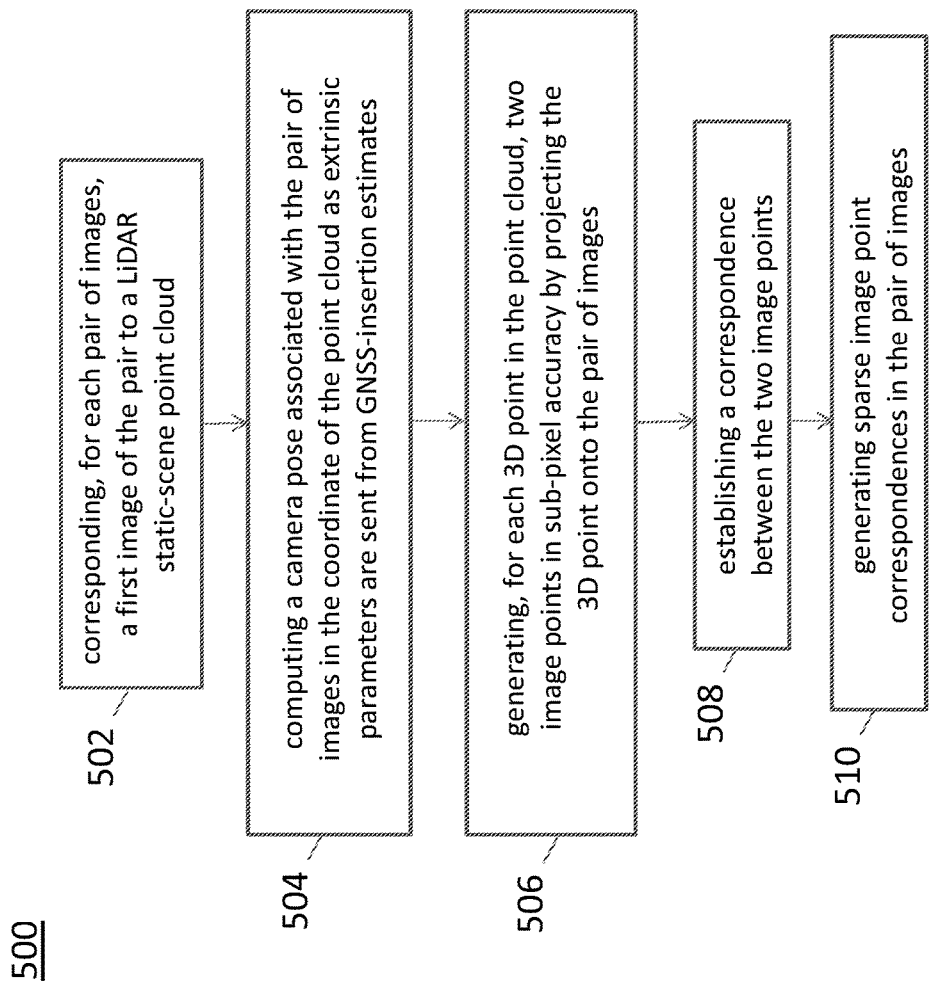
FIG. 5A is a flow diagram showing a method of generating sparse image point correspondences, in accordance with some embodiments.

FIG. 5A is a flow diagram showing a method 500 of generating sparse image point correspondences, in accordance with some embodiments.

Referring to FIG. 5A, in operation 502, for each pair of images, a first image of the pair is corresponded to a LiDAR static-scene point cloud.

In operation 504, a camera pose associated with the pair of images in the coordinate of the point cloud is computed as extrinsic parameters are sent from GNSS-insertion estimates.

Next, in operation 506, for each 3D point in the point cloud, two image points in sub-pixel accuracy are generated by projecting the 3D point onto the pair of images.

Subsequently, in operation 508, a correspondence between the two image points is established.

Then in operation 510, sparse image point correspondences in the pair of images are generated.

Figure 5B:
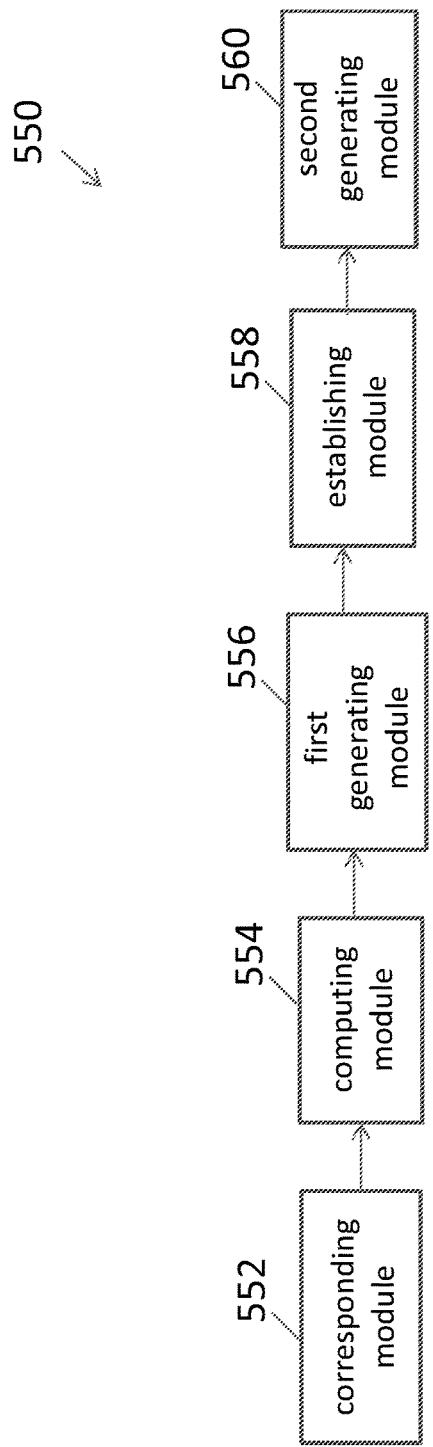
FIG. 5B is a block diagram of a system for generating sparse image point correspondences, in accordance with some embodiments.

FIG. 5B is a block diagram of a system 550 for generating sparse image point correspondences, in accordance with some embodiments.

Referring to FIG. 5B, the system 550 includes a corresponding module 552, a computing module 554, a first generating module 556, an establishing module 558 and a second generating module 560. The corresponding module 552 is configured to correspond, for each pair of images, a first image of the pair to a LiDAR static-scene point cloud.

The computing module 554 is configured to compute a camera pose associated with the pair of images in the coordinate of the point cloud as extrinsic parameters are sent from GNSS-insertion estimates. The first generating module 556 is configured to generate, for each 3D point in the point cloud, two image points in sub-pixel accuracy by projecting the 3D point onto the pair of images. The establishing module 558 is configured to establish a correspondence between the two image points. The second generating module 560 is configured to generate sparse image point correspondences in the pair of images.

Similarly, a computing system or a processor (such as that illustrated in FIG. 7) may be configured to execute program instructions that include a tool module configured to perform a method as described and illustrated with reference to FIG. 5. Accordingly, the tool module is configured to execute the operations including: corresponding, for each pair of images, a first image of the pair to a LiDAR static-scene point cloud; computing a camera pose associated with the pair of images in the coordinate of the point cloud, the computed camera pose to serve as extrinsic parameters from GNSS-insertion estimates; generating, for each 3D point in the point cloud, two image points in sub-pixel accuracy by projecting the 3D point onto the pair of images; establishing a correspondence between the two image points; and generating sparse image point correspondences in the pair of images.

Figure 6A:
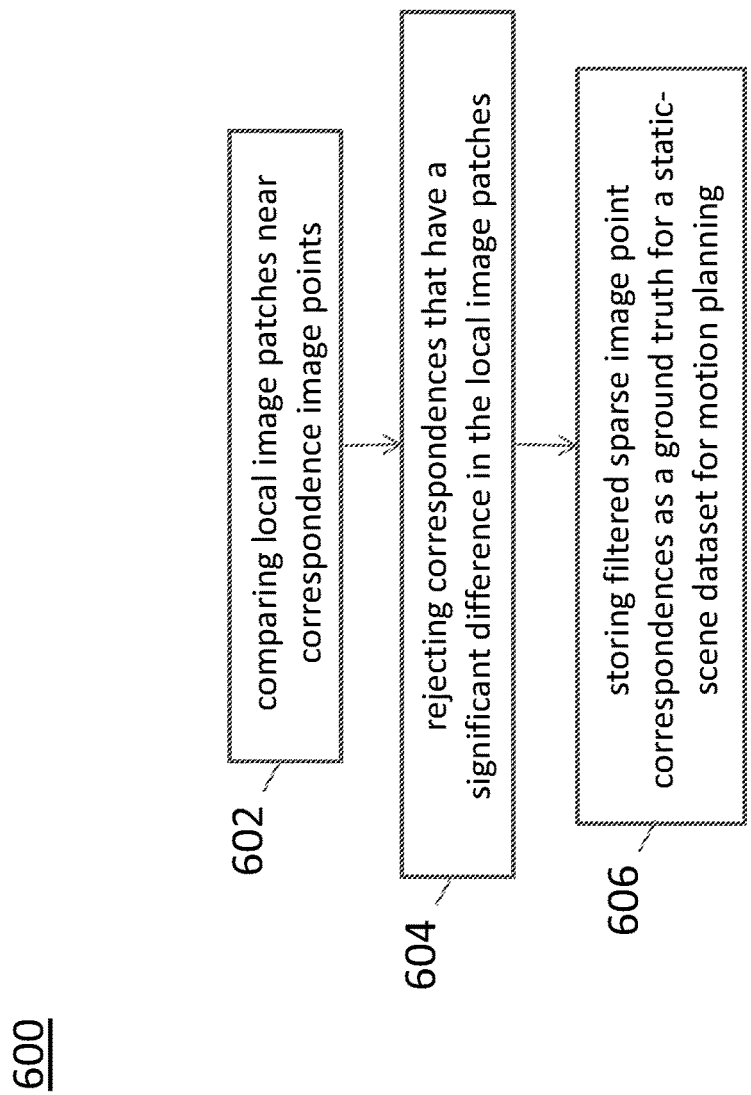
FIG. 6A is a flow diagram showing a method of refining sparse image point correspondences, in accordance with some embodiments.

FIG. 6A is a flow diagram showing a method 600 of refining sparse image point correspondences, in accordance with some embodiments.

Referring to FIG. 6A, in operation 602, local image patches near correspondence image points are compared against each other.

In operation 604, correspondences that have a significant difference in the local image patches are rejected.

Subsequently, in operation 606, filtered sparse image point correspondences are stored as a ground truth for a static-scene dataset for motion planning.

Figure 6B:
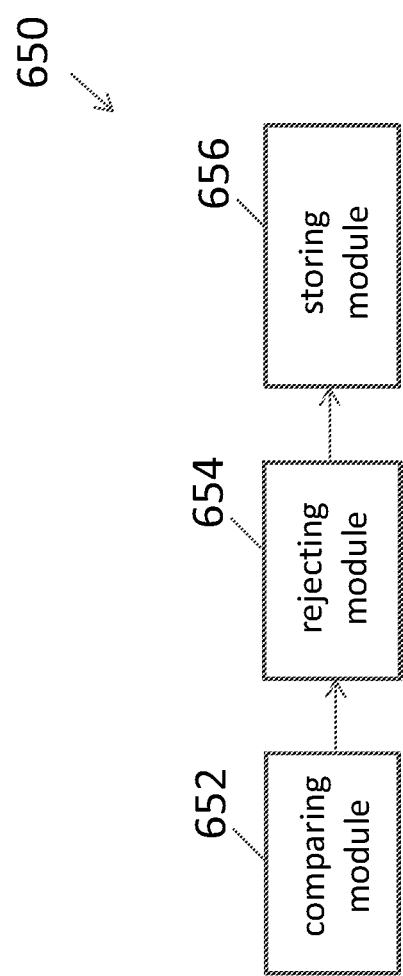
FIG. 6B is a block diagram of a system for refining sparse image point correspondences, in accordance with some embodiments.

FIG. 6B is a block diagram of a system 650 for refining sparse image point correspondences, in accordance with some embodiments.

Referring to FIG. 6B, the system 650 includes a comparing module 652, a rejecting module 654 and a storing module 656. The comparing module 652 is configured to compare local image patches near correspondence image points against each other. The rejecting module 654 is configured to reject correspondences that have a significant difference in the local image patches. The storing module 656 is configured to store filtered sparse image point correspondences as a ground truth for a static-scene dataset for motion planning of a vehicle.

Similarly, a computing system or a processor (such as that illustrated in FIG. 7) may be configured to execute program instructions that include a tool module configured to perform a method as described and illustrated with reference to FIG. 5. Accordingly, the tool module is configured to execute the operations: including comparing local image patches near correspondence image points; rejecting correspondences that have a significant difference in the local image patches; and storing filtered sparse image point correspondences as a ground truth for a static-scene dataset for motion planning.

FIG. 7 is a block diagram of a system 700 for generating a ground truth dataset for motion planning, in accordance with some embodiments.

Referring to FIG. 7, the system 700 includes a processor 701, an computer server 702, a network interface 703, an input and output (I/O) device 705, a storage device 707, a memory 709, and a bus or network 708. The bus 708 couples the network interface 703, the I/O device 705, the storage device 707 and the memory 709 to the processor 701.

Accordingly, the processor 701 is configured to enable the computer server 702, e.g., Internet server, to perform specific operations disclosed herein. It is to be noted that the operations and techniques described herein may be implemented, at least in part, in hardware, software, firmware, or any combination thereof. For example, various aspects of the described embodiments, e.g., the processor 701, the computer server 702, or the like, may be implemented within one or more processing units, including one or more microprocessing units, digital signal processing units (DSPs), application specific integrated circuits (ASICs), field programmable gate arrays (FPGAs), or any other equivalent integrated or discrete logic circuitry, as well as any combinations of such components.

The term "processing unit" or "processing circuitry" may generally refer to any of the foregoing logic circuitry, alone or in combination with other logic circuitry, or any other equivalent circuitry. A control unit including hardware may also perform one or more of the techniques of the present disclosure.

In some embodiments in accordance with the present disclosure, the computer server 702 is configured to utilize the I/O port 105 communicate with external devices via a network 708, such as a wireless network. In certain embodiments, the I/O port 105 is a network interface component, such as an Ethernet card, an optical transceiver, a radio frequency transceiver, or any other type of device that can send and receive data from the Internet. Examples of network interfaces may include Bluetooth®, 3G and WiFi® radios in mobile computing devices as well as USB. Examples of wireless networks may include WiFi®, Bluetooth®, and 3G. In some embodiments, the internet server 702 is configured to utilize the I/O port 105 to wirelessly communicate with a client device 710, such as a mobile phone, a tablet PC, a portable laptop or any other computing device with internet connectivity. Accordingly, electrical signals are transmitted between the computer server 700 and the client device 710.

In some embodiments in accordance with the present disclosure, the computer server 702 is a virtual server capable of performing any function a regular server has. In certain embodiments, the computer server 700 is another client device of the system 700. In other words, there may not be a centralized host for the system 700, and the client devices 710 in the system are configured to communicate with each other directly. In certain embodiments, such client devices 710 communicate with each other on a peer-to-peer (P2P) basis.

In some embodiments, the processor 701 is configured to execute program instructions that include a tool module configured to perform a method as described and illustrated with reference to FIGS. 1-6. Accordingly, the tool module is configured to execute the operations including: performing data alignment; calculating, among other sensors, light detecting and ranging (LiDAR)'s poses based on data collected by sensors; stitching multiple LiDAR scans to form a local map; refining positions in the local map based on a matching algorithm; and projecting 3D points in the local map onto corresponding images.

In some embodiments, the processor 701 is configured to execute program instructions that include a tool module configured to perform a method as described and illustrated with reference to FIGS. 1-6. Accordingly, the tool module is configured to execute the operations including: calculating LiDAR poses in response to data from sensors that include a LiDAR; generating undistorted LiDAR scans; extracting static points from a target undistorted LiDAR scan and generating a LiDAR static-scene point cloud; and generating sparse image point correspondences for each pair of images, using the LiDAR static-scene point cloud.

In an embodiment, the tool module is further configured to execute the operations including: filtering out sparse image point correspondences related to invalid pixels.

In addition, for extracting static points, the tool module is configured to execute the operations including: collecting LiDAR scans in the form of a swing while observing points within the swing at different time points; and detecting two GNSS-inertial pose estimates that are closest to LiDAR scan accusation time.

Also, to extract static points, the tool module is configured to execute the operations including: determining LiDAR's poses based on interpolation; and transforming LiDAR raw scans into undistorted LiDAR scans.

Moreover, to determine LiDAR's poses, the tool module is configured to execute the operations including: interpolating relative positions from a GNSS-inertial system.

Furthermore, to extract static points, the tool module is configured to execute the operations including: identifying, for a pair of undistorted LiDAR scans, points belong to a static object in an environment interpolating relative positions from a GNSS-inertial system; and aligning the points close based on GNSS-inertial estimates.

In addition, to extract static points, the tool module is configured to execute the operations including: transforming a reference scan that is close in time to a target undistorted LiDAR scan so as to align the reference scan with the target undistorted LiDAR scan.

Also, to extract static points, the tool module is configured to execute the operations including: determining that a distance between a point in the target undistorted LiDAR scan and its closest point in the aligned reference scan is smaller than a threshold; and extracting the point from the target undistorted LiDAR scan.

Moreover, to generate sparse image point correspondences, the tool module is configured to execute the operations including: corresponding, for each pair of images, a first image of the pair to a LiDAR static-scene point cloud; and computing a camera pose associated with the pair of images in the coordinate of the LiDAR static-scene point cloud as extrinsic parameters are sent from GNSS-insertion estimates.

Furthermore, to generate sparse image point correspondences, the tool module is configured to execute the operations including: generating, for each 3D point in the point cloud, two image points in sub-pixel accuracy by projecting the 3D point onto the pair of images; and establishing a correspondence between the two image points.

In addition, to filter out sparse image point correspondences, the tool module is configured to execute the operations including: comparing local image patches near correspondence image points; and rejecting correspondences hat have a significant difference in the local image patches.

Also, to filter out sparse image point correspondences, the tool module is configured to execute the operations including: storing filtered sparse image point correspondences as a ground truth for a static-scene dataset motion planning.

The network interface 703 is configured to access program instructions and data accessed by the program instructions stored remotely through a network (not shown).

The I/O device 705 includes an input device and an output device configured for enabling user interaction with the system 700. In some embodiments, the input device comprises, for example, a keyboard, a mouse, and other devices. Moreover, the output device comprises, for example, a display, a printer, and other devices.

The storage device 707 is configured for storing program instructions and data accessed by the program instructions. In some embodiments, the storage device 707 comprises, for example, a magnetic disk and an optical disk.

The memory 709 is configured to store program instructions to be executed by the processor 701 and data accessed by the program instructions. In some embodiments, the memory 709 comprises a random access memory (RAM) and/or some other volatile storage device and/or read only memory (ROM) and/or some other non-volatile storage device including other programmable read only memory (PROM), erasable programmable read only memory (EPROM), electronically erasable programmable read only memory (EEPROM), flash memory, a hard disk, a solid state drive (SSD), a compact disc ROM (CD-ROM), a floppy disk, a cassette, magnetic media, optical media, or other computer readable media. In certain embodiments, the memory 709 is incorporated into the processor 701.

Thus, specific embodiments and applications have been disclosed. It should be apparent, however, to those skilled in the art that many more modifications besides those already described are possible without departing from the disclosed concepts herein. The embodiment, therefore, is not to be restricted except in the spirit of the appended claims. Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Insubstantial changes from the claimed subject matter as viewed by a person with ordinary skill in the art, now known or later devised, are expressly contemplated as being equivalent within the scope of the claims. Therefore, obvious substitutions now or later known to one with ordinary skill in the art are defined to be within the scope of the defined elements. The claims are thus to be understood to include what is specifically illustrated and described above, what is conceptually equivalent, what can be obviously substituted and also what essentially incorporates the essential idea of the embodiment.

What is claimed is:

1. A system for generating a ground truth dataset for motion planning, the system comprising:
    an internet server, comprising:
        an I/O port, configured to transmit and receive electrical signals to and from a client device;
        a memory;
        one or more processing units; and
        one or more programs stored in the memory and configured for execution by the one or more processing units, the one or more programs including instructions for:
            a static point extracting module configured to generate a LiDAR static-scene point cloud based on undistorted LiDAR scans, wherein the static point extracting module is configured to execute the following steps in order to generate a LiDAR static-scene point cloud:
                a) identify points belonging to a static object in an environment for a pair of undistorted LiDAR scans;
                b) align close points based on GNSS-inertial estimates;
                c) transform a reference scan that is close in time to a target undistorted LiDAR scan so as to align the reference scan with the target undistorted LiDAR scan;
                d) determine that a distance between a point in the target undistorted LiDAR scan and its closest point in the aligned reference scan is smaller than a threshold; and
                e) extract the point from the target undistorted LiDAR scan in order to generate the LiDAR static-scene point cloud;
            a corresponding module configured to correspond, for each pair of images, a first image of the pair to the LiDAR static-scene point cloud for the motion planning of a vehicle; and
            a computing module configured to compute a camera pose associated with the pair of images in the coordinate of the LiDAR static-scene point cloud.

2. The system according to claim 1, wherein the computing module is configured to compute the camera pose associated with the pair of images in the coordinate of the LiDAR static-scene point cloud as extrinsic parameters are sent from GNSS-insertion estimates.

3. The system according to claim 1 further comprising:
    a first generating module configured to generate, for each 3D point in the LiDAR static-scene point cloud, two image points in sub-pixel accuracy.

4. The system according to claim 3, wherein the first generating module is configured to generate the two image points in sub-pixel accuracy by projecting the 3D point onto the pair of images.

5. The system according to claim 3 further comprising:
    an establishing module configured to establish a correspondence between the two image points.

6. The system according to claim 5 further comprising:
    a second generating module configured to generate sparse image point correspondences in the pair of images.

7. The system according to claim 6 further comprising:
    a comparing module configured to compare local image patches near correspondence image points.

8. The system according to claim 7 further comprising:
    a rejecting module configured to reject correspondences that have a significant difference in the local image patches.

9. The system according to claim 8 further comprising:
    a storing module configured to store sparse image point correspondences as a ground truth for a static-scene dataset for motion planning.

10. A system having a non-transitory computer readable storage medium storing one or more programs, the one or more programs comprising instructions which, when executed by the one or more processors of a computing device, cause the computing device to:
    generate a LiDAR static-scene point cloud based on undistorted LiDAR scans, wherein following steps are included:
        a) identify points belonging to a static object in an environment for a pair of undistorted LiDAR scans;
        b) align close points based on GNSS-inertial estimates;

c) transform a reference scan that is close in time to a target undistorted LiDAR scan so as to align the reference scan with the target undistorted LiDAR scan;
d) determine that a distance between a point in the target undistorted LiDAR scan and its closest point in the aligned reference scan is smaller than a threshold; and
e) extract the point from the target undistorted LiDAR scan in order to generate the LiDAR static-scene point cloud;

correspond, for each pair of images, a first image of the pair to the LiDAR static-scene point cloud for a motion planning of a vehicle; and compute a camera pose associated with the pair of images in the coordinate of the LiDAR static-scene point cloud and align close points based on pose estimates.

11. The system according to claim 10, further comprising instructions which, when executed by the one or more processors, cause the computing device to:
compute the camera pose associated with the pair of images in the coordinate of the LiDAR static-scene point cloud as extrinsic parameters are sent from GNSS-insertion estimates.

12. The system according to claim 10, further comprising instructions which, when executed by the one or more processors, cause the computing device to:
generate, for each 3D point in the LiDAR static-scene point cloud, two image points in sub-pixel accuracy.

13. The system according to claim 12, further comprising instructions which, when executed by the one or more processors, cause the computing device to:
generate the two image points in sub-pixel accuracy by projecting the 3D point onto the pair of images.

14. The system according to claim 12, further comprising instructions which, when executed by the one or more processors, cause the computing device to:
establish a correspondence between the two image points.

15. The system according to claim 14, further comprising instructions which, when executed by the one or more processors, cause the computing device to:
generate sparse image point correspondences in the pair of images.

16. The system according to claim 15, further comprising instructions which, when executed by the one or more processors, cause the computing device to:
compare local image patches near correspondence image points.

17. The system according to claim 16, further comprising instructions which, when executed by the one or more processors, cause the computing device to:
reject correspondences that have a significant difference in the local image patches.

18. The system according to claim 17, further comprising instructions which, when executed by the one or more processors, cause the computing device to:
store sparse image point correspondences as a ground truth for a static-scene dataset for motion planning.

19. A method of generating a ground truth dataset for motion planning for a non-transitory computer readable storage medium storing one or more programs, the one or more programs comprising instructions which, when executed by the one or more processors of a computing device, cause the computing device to:

generate a LiDAR static-scene point cloud based on undistorted LiDAR scans, wherein following steps are included:
a) identify points belonging to a static object in an environment for a pair of undistorted LiDAR scans;
b) align close points based on GNSS-inertial estimates;
c) transform a reference scan that is close in time to a target undistorted LiDAR scan so as to align the reference scan with the target undistorted LiDAR scan;
d) determine that a distance between a point in the target undistorted LiDAR scan and its closest point in the aligned reference scan is smaller than a threshold; and
e) extract the point from the target undistorted LiDAR scan in order to generate the LiDAR static-scene point cloud;

correspond, for each pair of images, a first image of the pair to the LiDAR static-scene point cloud for a motion planning of a vehicle; and compute a camera pose associated with the pair of images in the coordinate of the LiDAR static-scene point cloud and align close points based on pose estimates.

20. The method according to claim 19, further comprising instructions which, when executed by the one or more processors, cause the computing device to:
compute the camera pose associated with the pair of images in the coordinate of the LiDAR static-scene point cloud as extrinsic parameters are sent from GNSS-insertion estimates.

21. The method according to claim 19, further comprising instructions which, when executed by the one or more processors, cause the computing device to:
generate, for each 3D point in the LiDAR static-scene point cloud, two image points in sub-pixel accuracy.

22. The system according to claim 21, further comprising instructions which, when executed by the one or more processors, cause the computing device to:
generate the two image points in sub-pixel accuracy by projecting the 3D point onto the pair of images.

23. The method according to claim 21, further comprising instructions which, when executed by the one or more processors, cause the computing device to:
establish a correspondence between the two image points.

24. The method according to claim 23, further comprising instructions which, when executed by the one or more processors, cause the computing device to:
generate sparse image point correspondences in the pair of images.

25. The method according to claim 24, further comprising instructions which, when executed by the one or more processors, cause the computing device to:
compare local image patches near correspondence image points.

26. The method according to claim 25, further comprising instructions which, when executed by the one or more processors, cause the computing device to:
reject correspondences that have a significant difference in the local image patches.

27. The method according to claim 26, further comprising instructions which, when executed by the one or more processors, cause the computing device to:
store sparse image point correspondences as a ground truth for a static-scene dataset for motion planning.

* * * * *